(12) United States Patent
Hikita et al.

(10) Patent No.: US 6,679,424 B2
(45) Date of Patent: Jan. 20, 2004

(54) NON CONTACT TYPE IC CARD

(75) Inventors: Junichi Hikita, Kyoto (JP); Yoshihiro Ikefuji, Kyoto (JP); Shigemi Chimura, Kyoto (JP); Haruo Taguchi, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 10/287,494

(22) Filed: Nov. 5, 2002

(65) Prior Publication Data

US 2003/0066895 A1 Apr. 10, 2003

Related U.S. Application Data

(62) Division of application No. 09/341,676, filed as application No. PCT/JP98/00060 on Jan. 9, 1998.

(30) Foreign Application Priority Data

Jan. 21, 1997 (JP) .................................................. 9-8869

(51) Int. Cl.[7] .................................................. G06K 5/00
(52) U.S. Cl. .......................... 235/380; 235/382; 705/41
(58) Field of Search ................................. 235/380, 382, 235/439, 492; 705/35, 39, 41, 44, 57, 64, 65, 71, 72

(56) References Cited

U.S. PATENT DOCUMENTS

| 4,767,920 A | 8/1988 | Kitta et al. |
| 4,887,234 A | 12/1989 | Iijima |
| 4,930,129 A | 5/1990 | Takahira |
| 5,191,608 A | 3/1993 | Geronimi |
| 5,467,081 A | 11/1995 | Drews et al. |
| 5,521,362 A | 5/1996 | Powers |
| 5,530,232 A | * 6/1996 | Taylor ........................ 235/380 |
| 5,542,081 A | 7/1996 | Geronimi |
| 5,644,638 A | 7/1997 | Thiriet |
| 5,724,544 A | 3/1998 | Nishi |

FOREIGN PATENT DOCUMENTS

| EP | 451936 A1 | 10/1991 |
| JP | 63-82533 | 4/1988 |
| JP | 63-229542 | 9/1988 |
| JP | 1-233690 | 9/1989 |
| JP | 1-292489 | 11/1989 |
| JP | 3-253397 | 11/1991 |
| JP | 04-141893 | 5/1992 |
| JP | 04-151893 | 5/1992 |
| JP | 4-216189 | 8/1992 |
| JP | 07-078231 | 7/1993 |
| JP | 6-60236 | 3/1994 |
| JP | 8-101902 | 4/1996 |

* cited by examiner

*Primary Examiner*—Diane I. Lee
(74) *Attorney, Agent, or Firm*—Arent Fox Kintner Plotkin & Kahn, PLLC

(57) ABSTRACT

A memory (1) in a non contact type IC card (100) includes a data protection region (B2) storing data requiring security and an region (B1) storing other data. A main control circuit (2) generates data to be stored and designates a location for data storage in the region (B1) or the data protection region (B2) according to a content of the data. An address non selecting circuit (4) selects whether the generated data is to be written into the location in the data protection region (B2) designated by the main control circuit (2) according to a state of a state setting circuit (3).

1 Claim, 7 Drawing Sheets

FIG. 2

NON CONTACT TYPE IC CARD

This is a Division of application Ser. No. 09/341,676 filed Jul. 20, 1999, which is a 371 of PCT/JP98/00060 filed on Jan. 9, 1998. The disclosure of the prior application is hereby incorporated by reference herein in its entirety.

TECHNICAL FIELD

The present invention relates to a non contact type IC card, and more particularly to a non contact type IC card allowing the protection of data stored in the card and the prevention of data falsification.

BACKGROUND ART

A non contact type IC card performing data communication with an interrogator installed outside has been used conventionally. The examples include a ticket for ski lift, a seasonal ticket for the transportation and a prepaid card.

FIG. 7 is a block diagram schematically showing a basic structure of a conventional non contact type IC card 900. Conventional non contact type IC card 900 shown herein, which is an IC card performing data communication in a signal superposing manner, supplies power and transmits/receives information using a signal(s) having one or more frequencies received from the interrogator not shown.

Conventional non contact type IC card 900 as shown in FIG. 7 is an example of non contact type IC cards utilizing a single frequency and includes a tuning circuit 20, a rectifying circuit 21, an amplifying/demodulating circuit 22, a modulating/amplifying circuit 23 and an SP/PS conversion circuit 24.

Tuning circuit 20 includes a coil L functioning as an antenna and a capacitor C0. Rectifying circuit 21 rectifies a signal received at tuning circuit 20, thereby generates and supplies the power to each part of non contact type IC card 900.

Amplifying/demodulating circuit 22 amplifies and demodulates data Q from an interrogator received at tuning circuit 20. A signal output from amplifying/demodulating circuit 22 is SP-converted by SP/PS conversion circuit 24 and then is output to a main control circuit 2 described below.

With reference to FIG. 7, conventional non contact type IC card 900 further includes main control circuit 2 and a memory 1.

Main control circuit 2 processes a signal output from SP/PS conversion circuit 24. Main control circuit 2 generates data DA to be stored in memory 1 described below and designates a location (address) of memory 1 to which data DA is to be written.

Memory 1 includes normal data storage region B1 and data protection region B2. Memory 1 receives data DA via a data line L2 as well as an address signal AD via an address line L1 indicating an address (a location to which data is to be written) to which data DA is to be written. Here, data stored in data protection region B2 particularly requires security in order to guarantee a normal data communication and whose rewriting is inhibited. An example of such data is an ID number of an ID card holding the personal information.

In addition, main control circuit 2 reads data from designated region B1 or data protection region B2 of memory 1 according to the contents of data Q received from the interrogator and generates a response data A based on the read data. Response data A is PS-converted at SP/PS conversion circuit 24, processed at modulating/amplifying circuit 23 and then transmitted to the interrogator via coil L forming the antenna.

In conventional non contact type IC card 900, however, the rewriting (falsification) of stored data in memory 1 can be easily performed from a device other than the interrogator once the protocol of the data communication with the interrogator is decoded, therefore the security cannot be guaranteed.

Hence an object of the present invention is to provide a non contact type IC card allowing the prevention of rewriting of a storage region in which data requiring security is stored.

Another object of the present invention is to provide a highly reliable non contact type IC card through the control of rewriting of the storage region in which data requiring security is stored.

DISCLOSURE OF THE INVENTION

A non contact type IC card according to the present invention is responsive to externally applied data for performing data communication, and includes: a first storing circuit storing data requiring security; a second storing circuit storing data other than the data to be stored in the first storing circuit; a control circuit controlling for writing the data into a location in one of the first storing circuit and the second storing circuit according to a content of the data; a selection circuit selecting whether the data is to be written into the location in the first storing circuit designated by the control circuit; and a state setting circuit controlling the selection by the selection circuit, the data is written into the location in the first storing circuit designated by the control circuit when the state setting circuit is in a first state, whereas, the data is inhibited from being written into the first storing circuit designated by the control circuit when the state setting circuit is in a second state other than the first state.

In another aspect of the present invention, a non contact type IC card is responsive to externally applied data for performing data communication, and includes: a first storing circuit storing the data requiring security; a second storing circuit storing data other than the data to be stored in the first storing circuit; a control circuit controlling for writing the data into a location in one of the first storing circuit and the second storing circuit according to a content of the data; a detection circuit receiving a control signal from the control circuit and giving instruction for controlling a state of the first storing circuit; and a selection circuit receiving the instruction of the detection circuit and selecting whether the data is to be written into the location of the first storing circuit designated by the control circuit; and the control signal output from the control circuit indicates whether the first storing circuit is in a data rewriting permitted state or a data rewriting inhibited state; and the data is written into the location in the first storing circuit designated by the control circuit when the detection circuit detects that the first storing circuit is in the data rewriting permitted state, whereas the data is not written into the location in the first storing circuit designated by the control circuit when the detection circuit detects that the first storing circuit is in the data rewriting inhibited state.

In still another aspect of the present invention, a non contact type IC card performs a data communication based on an externally applied radio wave signal, and includes: a receiving circuit receiving the radio wave signal; a first storing circuit storing the data requiring security; a second storing circuit storing data other than the data to be stored in the first storing circuit; a control circuit generating the data based on the radio wave signal received at the receiving circuit and controlling for writing the data into a location in one of the first storing circuit and the second storing circuit according to a content of the generated data; a detection circuit detecting a frequency of the radio wave signal received by the receiving circuit; and a selection circuit selecting whether the data is to be written into the location in the first storing circuit designated by the control circuit based on a result of the detection by the detection circuit; and wherein the data is written into the location in the first storing circuit designated by the control circuit, when the receiving circuit receives the radio wave signal and the frequency of the radio wave signal is detected to be a first frequency by the detection circuit, whereas the data is not written into the location in the first storing circuit designated by the control circuit when the frequency of the radio wave signal is detected to be a second frequency other than the first frequency by the detection circuit.

In still another aspect of the present invention, a non contact type IC card is responsive to externally applied data for performing data communication, and includes: a first storing circuit storing the data requiring security; a second storing circuit storing data other than the data to be stored in the first storing circuit; a control circuit controlling for writing the data into a location in one of the first storing circuit and the second storing circuit according to a content of the data; and a data fixing circuit receiving the data to be written into the location in the first storing circuit designated by the control circuit and supplying a particular data; and wherein a value of the predetermined data supplied from the data fixing circuit is a value determined by an initial state of the first storing circuit, and wherein only the particular data supplied from the data fixing circuit is written into the location in the first storing circuit designated by the control circuit.

In still another aspect of the present invention, a non contact type IC card is responsive to externally applied data for performing data communication, and includes: a first storing circuit storing said data requiring security; a second storing circuit storing data other than the data to be stored in the first storing circuit; a control circuit controlling for writing the data into a location in one of the first storing circuit and the second storing circuit according to a content of the data; a selection circuit selecting whether the data is to be written into the location in the first storing circuit designated by the control circuit; and a state setting circuit controlling the selection by the selection circuit; and wherein the data is written into the location in the first storing circuit designated by the control circuit when the state setting circuit is in a first state, whereas, the data is written into a location other than the location in the first storing circuit designated by the control circuit when the state setting circuit is in a second state other than the first state.

In still another aspect of the present invention, a non contact type IC card is responsive to externally applied data for performing data communication, and includes: a first storing circuit storing the data requiring security; a second storing circuit storing data other than the data to be stored in the first storing circuit; and a control circuit controlling for writing the data into a location in one of the first storing circuit and the second storing circuit according to a content of the data; and wherein the first storing circuit allows rewriting of a predetermined times.

Therefore a main advantage of the present invention lies in the prevention of falsification of storage contents through the control of rewriting of data stored in a storage portion storing data requiring security.

BRIEF DESCRIPTION OF THE DRAWINGS

FIG. 2 shows a structure of a main portion of a non contact type IC card 200 according to a second embodiment of the present invention.

BEST MODES FOR CARRYING OUT THE INVENTION

First Embodiment

The first embodiment of the present invention allows the prevention of rewriting of data previously stored in a data protection region by controlling an address to which data is to be written, at data writing for the data protection region of a memory in a non contact type IC card.

Figure 1:
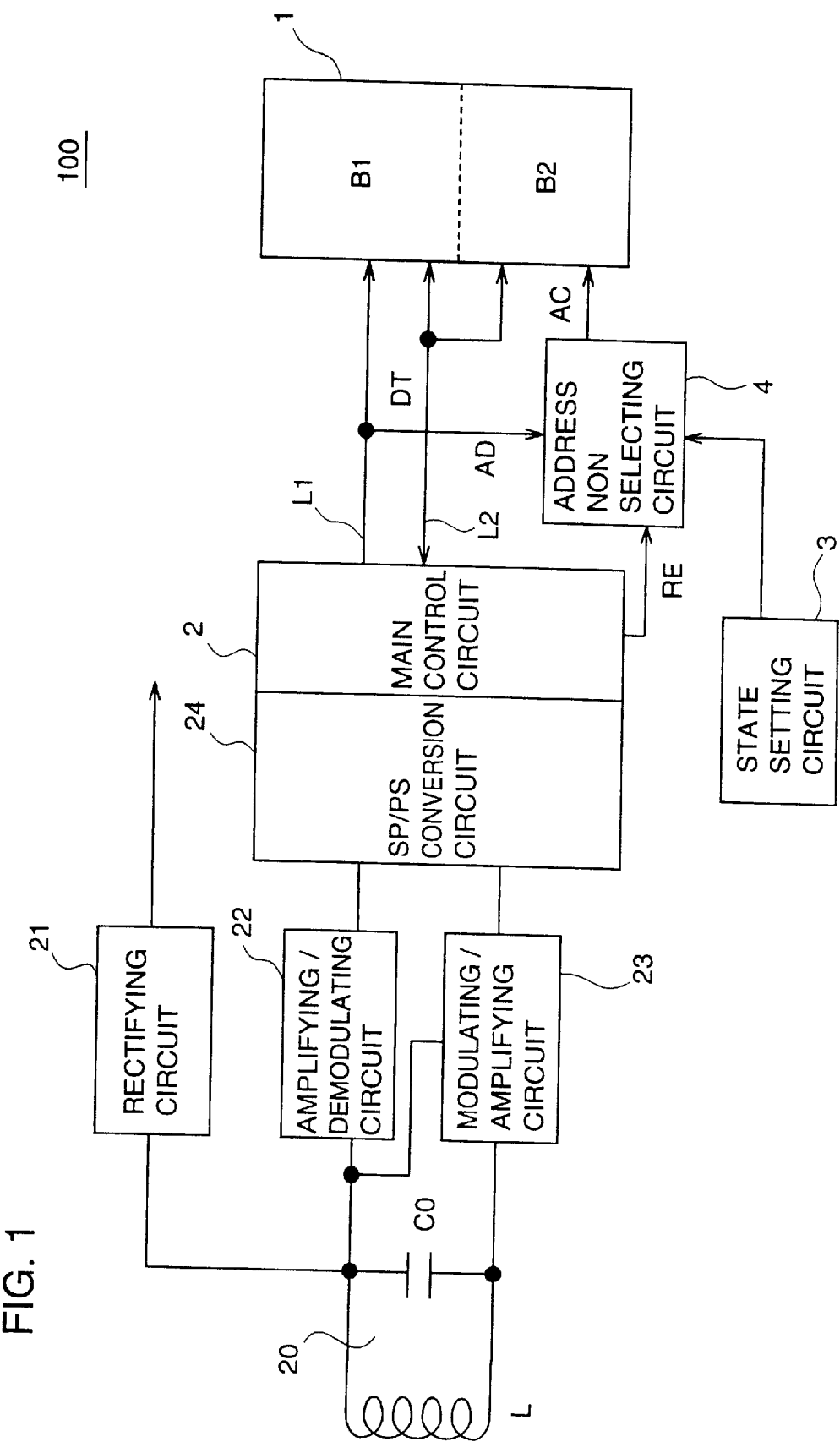
FIG. 1 shows a structure of a main portion of a non contact type IC card 100 according to a first embodiment of the present invention.
Figure 7:
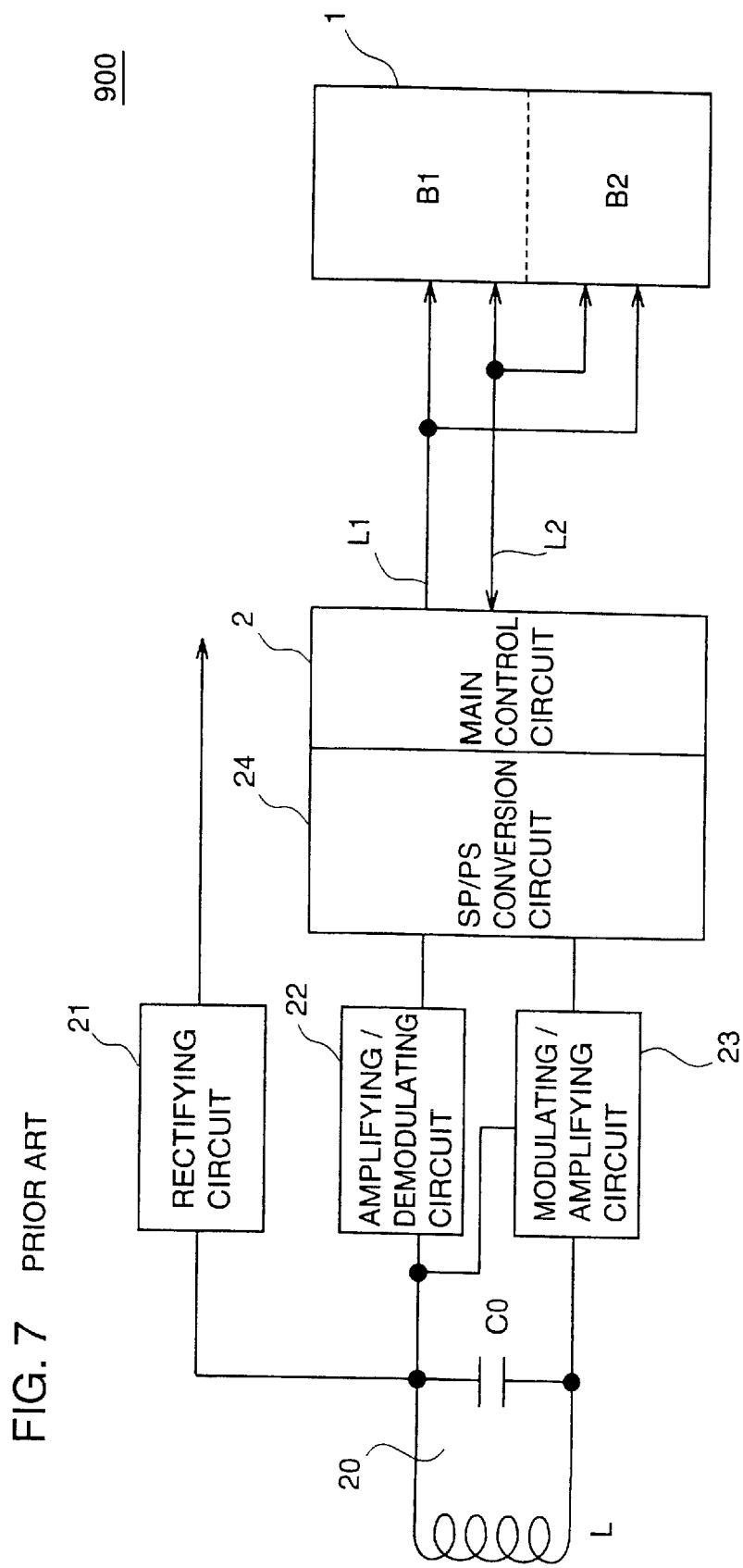
FIG. 7 is a diagram schematically showing a structure of a conventional non contact type IC card 900.

FIG. 1 shows a structure of a main portion of a non contact type IC card 100 according to the first embodiment of the present invention. Components similar to those in conventional non contact type IC card 900 shown in FIG. 7 are denoted by the same reference numbers and same reference characters and the description thereof will not be repeated. Here, data transmission of the non contact type IC card adopting the present invention may be either in a signal superposing method or in a signal separating method.

Non contact type IC card 100 shown in FIG. 1 differs from conventional non contact type IC card 900 in that card 100 includes a state setting circuit 3 and an address non selecting circuit 4 controlling a write address designated at data writing for data protection region B2 of memory 1.

With reference to FIG. 1, the structure of non contact type IC card 100 according to the first embodiment of the present invention will be described.

Address non selecting circuit 4 receives a write enable signal RE supplied from main control circuit 2 and an address signal AD from an address line L1 as inputs. Here, address signal AD designates a location in data protection region B2 to which data DT on a data line L2 is to be written, and write enable signal RE designates a data writing operation to data protection region B2. Address non selecting circuit 4 being controlled by state setting circuit 3 described below outputs an address selecting signal AC according to address signal AD.

State setting circuit 3 controls address non selecting circuit 4 described above.

Address selecting signal AC output from address non selecting circuit 4 changes its state based on a state (active state/inactive state) of state setting circuit 3. Specifically, when state setting circuit 3 is in an active state, an output address selecting signal AC selects a location designated by address AD as a location to which data is to be written, whereas when state setting circuit 3 is in an inactive state, an output address selecting signal AC inhibits the writing to the location designated by address signal AD (non select state).

Data DT will be written into a location in data protection region B2 corresponding to and based on address selecting signal AC output from address non selecting circuit 4.

Next, an operation of non contact type IC card 100 according to the first embodiment of the present invention will be described.

First, when state setting circuit 3 is in an active state, address non selecting circuit 4 having received write enable signal RE and address signal AD outputs address selecting signal AC selecting a location designated by the address signal AD. In this case data DT will be written into the corresponding location in data protection region B2.

On the other hand, when stage setting circuit 3 is in an inactive state, address non selecting circuit 4 having received write enable signal RE and address signal AD outputs address selecting signal AC turning the location designated by the address signal AD to a non select state. In this case data DT is not written into data protection region B2.

One example of such state setting circuit 3 uses a fuse. For example, when a fuse is used, any numbers of data can be written into data protection region B2 before the fuse blow, however, after the fuse blow, data in data protection region B2 can not be rewritten. The methods of blowing the fuse includes high voltage application, laser cutting, induction heating or the like.

In other words, by controlling the state of state setting circuit 3, non contact type IC card 100 can inhibit the access to data protection region B2 for data rewriting after the data requiring security is stored in data protection region B2 (for simplicity this state is referred to as protection data storage state).

Thus in non contact type IC card 100, as the address selection for the data protection region can be controlled at the data writing operation, the falsification of data previously stored in the data protection region can be prevented.

Second Embodiment

Similar to the first embodiment of the present invention, the non contact type IC card according to the second embodiment of the present invention allows the prevention of rewriting of data stored in the data protection region by controlling an address to which the data is to be written at the time of data writing to the data protection region in the memory.

Figure 2:
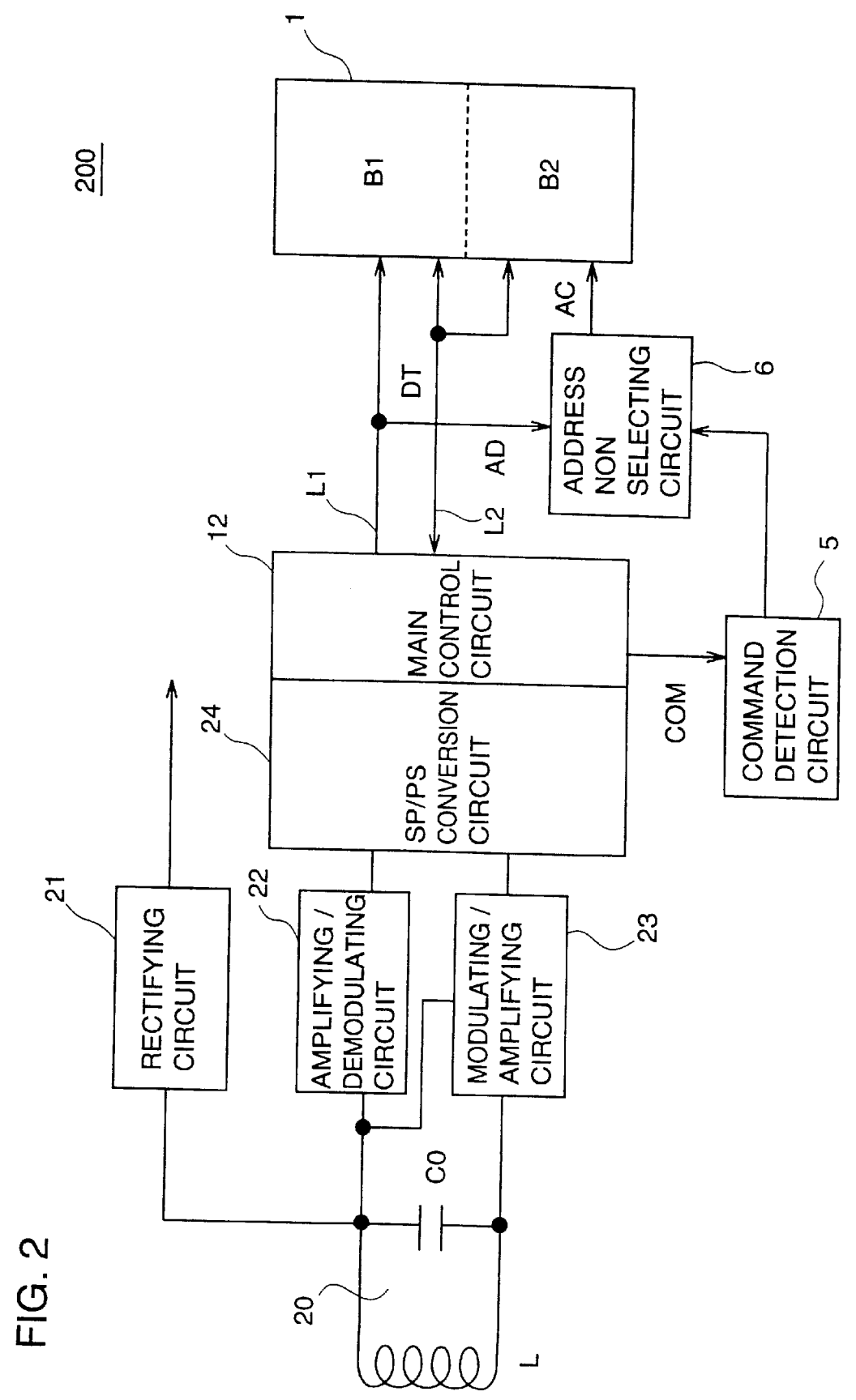

FIG. 2 shows a structure of a main portion of a non contact type IC card 200 according to the second embodiment of the present invention and components similar to those in non contact type IC card 100 shown in FIG. 1 are denoted by the same reference numbers and same reference characters and the description thereof will not be repeated.

Non contact type IC card 200 shown in FIG. 2 is different from conventional non contact type IC card 900 in that it includes a command detection circuit 5 and an address non selecting circuit 6 controlling a designated address to which data is to be written at the time of data writing to the data protection region of the memory, and controls these circuits by a command output from a main control circuit 12.

With reference to FIG. 2, the structure of non contact type IC card 200 according to the second embodiment of the present invention will now be described.

Address non selecting circuit 6 receives an address signal AD via an address line L1 as an input. Here, address signal AD indicates a location in data protection region B2 to which data DT on a data line L2 is to be written. Address non selecting circuit 6 controlled by command detection circuit 5 described below outputs address selecting signal AC according to the address signal AD.

Command detection circuit 5 receives an address control command COM output from main control circuit 12 and controls address non selecting circuit 6. Here, address control command COM is a command permitting or inhibiting a data writing operation to data protection region B2 based on the address signal AD.

Address selecting signal AC output from address non selecting circuit 6 changes its state according to a state of command detection circuit 5. Specifically, when command detection circuit 5 detects a writing permitted state of a data protection region B2, an address selecting signal AC selecting a location designated by address AD as a location to which data is to be written is output. On the other hand, if data protection region B2 is detected to be in a writing inhibited state, address selecting signal AC turning a location designated by address signal AD to a non select state is output.

Based on the address selecting signal AC supplied from address non selecting circuit 6, data DT is written into a corresponding location in data protection region B2.

Next an operation of non contact type IC card 200 according to the second embodiment of the present invention will be described.

When an address control command COM permitting the data writing is supplied from main control circuit 12, and is detected by command detection circuit 5, address non selecting circuit 6 outputs an address selecting signal AC selecting a location designated by the address signal AD. In this case data DT is written into a corresponding location in data protection region B2.

On the other hand, when an address control command COM inhibiting the data writing is supplied from main control circuit 12, and is detected by command detection circuit 5, address non selecting circuit 6 outputs an address selecting signal AC turning the location designated by the address signal AD to a non select state. In this case data DT is not written into data protection region B2.

Thus, non contact type IC card 200 allows the adjustment of storage of data requiring security in data protection region B2 (turning data protection region B2 to the protection data storage state) and inhibiting the access to data protection region B2 for the data rewriting, through the control of command detection circuit 5 based on a command output from main control circuit 12.

As non contact type IC card 200 allows the control of selection of address of the data protection region at the data writing operation, the falsification of data previously stored in the data protection region can be prevented.

Third Embodiment

The third embodiment of the present invention allows the prevention of rewriting of data once stored in the data protection region in the non contact type IC card through the access control for the data protection region according to the frequency for data communication.

Figure 3:
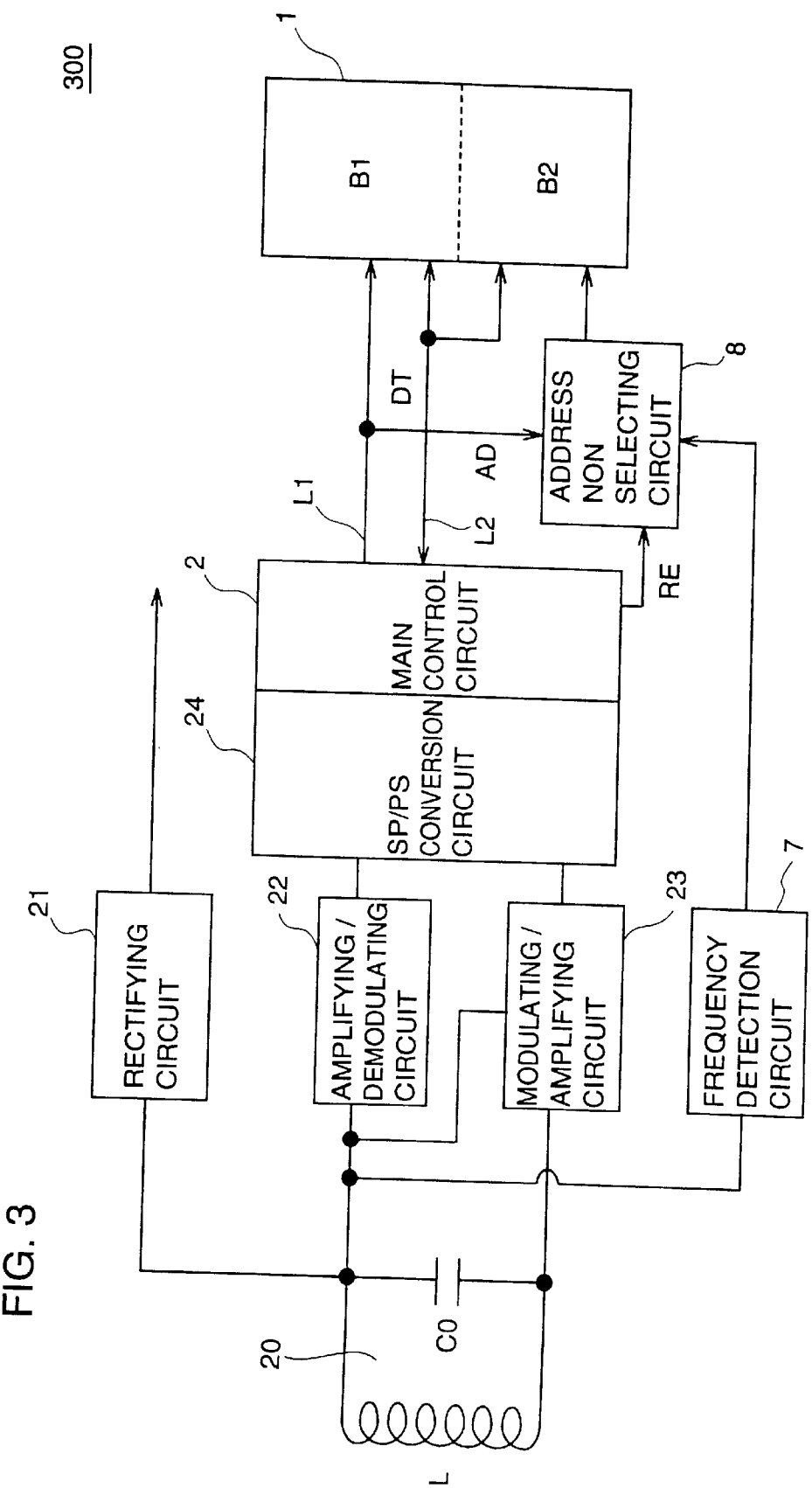
FIG. 3 shows a structure of a main portion of a non contact type IC card 300 according to a third embodiment of the present invention.

FIG. 3 shows a structure of a main portion of a non contact type IC card 300 according to the third embodiment of the present invention, wherein components similar to those in non contact type IC card 100 shown in FIG. 1 are denoted by the same reference numbers and same reference characters, and the description thereof will not be repeated.

Non contact type IC card 300 shown in FIG. 3 is different from conventional non contact type IC card 900 in that it includes a frequency detection circuit 7 and an address non selecting circuit 8.

With reference to FIG. 3, the structure of non contact type IC card 300 according to the third embodiment of the present invention will now be described.

Frequency detection circuit 7 detects a frequency of a radio wave received by tuning circuit 20 and includes a band pass filter and a switching circuit inside not shown. When a carrier frequency of a received radio wave is a predetermined frequency F1, frequency detection circuit 7 detects the reception of an intended radio wave.

Address non selecting circuit 8 receives address signal AD via address line L1 and a write enable signal RE from main control circuit 2 as inputs. Here, address signal AD designates a location in data protection region B2 to which data DT on data line L2 is to be written.

Address non selecting circuit 8 controlled by frequency detection circuit 7 outputs address selecting signal AC according to address signal AD. More specifically, when frequency detection circuit 7 detects the reception of an intended radio wave (with predetermined frequency F1), an address selecting signal AC selecting a location designated by address signal AD as a location to which data is to be written is output, and otherwise (when received radio wave has a frequency other than the predetermined frequency F1), an address selecting signal AC turning the location designated by the address signal AD to a non select state is output.

Based on the address selecting signal AC, data DT is written into the corresponding location in data protection region B2.

With reference to FIG. 3, an operation of non contact type IC card 300 will be described specifically.

As described above, when a radio wave with a carrier frequency F1 is received, address non selecting circuit 8 outputs an address selecting signal AC selecting a location designated by address signal AD. In this case data DT is written into the corresponding location in data protection region B2.

On the other hand, when a radio wave with a carrier frequency being an original frequency F0 different from F1 is received, address non selecting circuit 8 outputs an address selecting signal AC turning the location designated by address signal AD to a non select state. In this case data DT is not written into data protection region B2.

In other words, non contact type IC card 300 allows the adjustment of the storage of data requiring security in data protection region B2 (turning data protection region B2 to the protection data storage state) and inhibiting the access to data protection region B2 for the data rewriting, through the use of different frequencies.

Thus, as a non contact type IC card 300 allows the access control for the data protection region according to the frequency of radio wave for the data communication, the falsification of data previously stored in the data protection region can be prevented.

Fourth Embodiment

The fourth embodiment of the present invention allows the prevention of data falsification, which is the object of the present invention, in the non contact type IC card by controlling the data to be written at the data writing to the data protection region in the memory.

Figure 4:
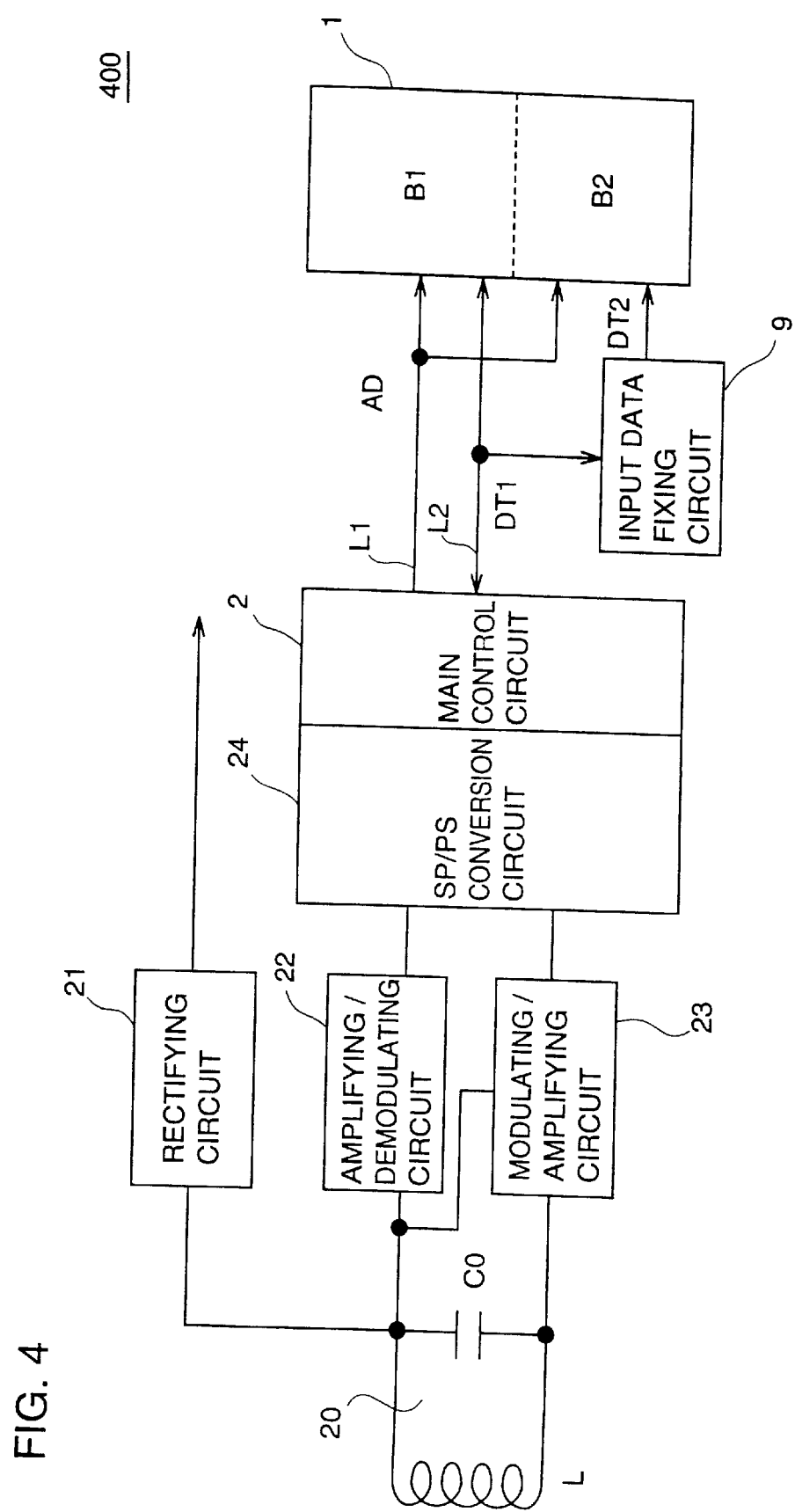
FIG. 4 shows a structure of a main portion of a non contact type IC card 400 according to a fourth embodiment of the present invention.

FIG. 4 shows a structure of a main portion of a non contact type IC card 400 according to the fourth embodiment of the present invention, wherein components similar to those in non contact type IC card 100 shown in FIG. 1 are denoted by the same reference numbers and same reference characters, and the description thereof will not be repeated.

Non contact type IC card 400 shown in FIG. 4 is different from conventional non contact type IC card 900 in that it includes an input data fixing circuit 9 controlling data to be written into data protection region B2 of memory 1.

With reference to FIG. 4, the structure of non contact type IC card 400 according to the fourth embodiment of the present invention will be described.

Input data fixing circuit 9 fixes a state of each location in data protection region B2 of memory 1.

Input data fixing circuit 9 receives data DT1 via a data line L2 as an input, converts data DT1 and outputs data DT2. Data DT2 is data to be written into data protection region B2.

A value of data DT2 output from input data fixing circuit 9 is determined based on an initial state of data protection region B2. When states of all bits in data protection region B2 are "1", for example, data DT2 always takes a value of the reverse polarity, in this case "0". Hence, when main control circuit 2 outputs data DT1 corresponding to the value "1", the data writing to data protection region B2 will not be performed.

With reference to FIG. 4, an operation of non contact type IC card 400 will be described specifically.

Assume that an initial state of each bit in data protection region B2 in memory 1 is set to "1" (the state of bit to "1111"). In this case, input data fixing circuit 9 receiving data DT1 outputs only the data DT2 of "0" for each bit.

First, data requiring security will be written into data protection region B2 (protection data storage state). Here, assume that the protection data storage state is "1100". As described above, data DT2 output from input data fixing circuit 9 takes the value "0". Therefore, the bit once takes the state "0" cannot be returned to the state "1". As a result, thereafter, the state of data protection region B2 ("1100") cannot be rewritten to "1101", for example.

Thus, data protection region B2 of non contact type IC card 400 functions as an OTP ROM (a non volatile memory allowing only one rewriting) and once data is stored in the data protection region, trial of the data rewriting is highly likely to result in a failure of an intended data setting.

Thus, as described above, as non contact type IC card 400 allows the control of data to be written into the data protection region at the data writing operation, the rewriting of data once stored in the data protection region can be prevented.

Fifth Embodiment

The fifth embodiment of the present invention allows the prevention of data falsification, which is the object of the present invention, in the non contact type IC card, by controlling an address to which data is to be written at the data writing operation to the data protection region of the memory.

Figure 5:
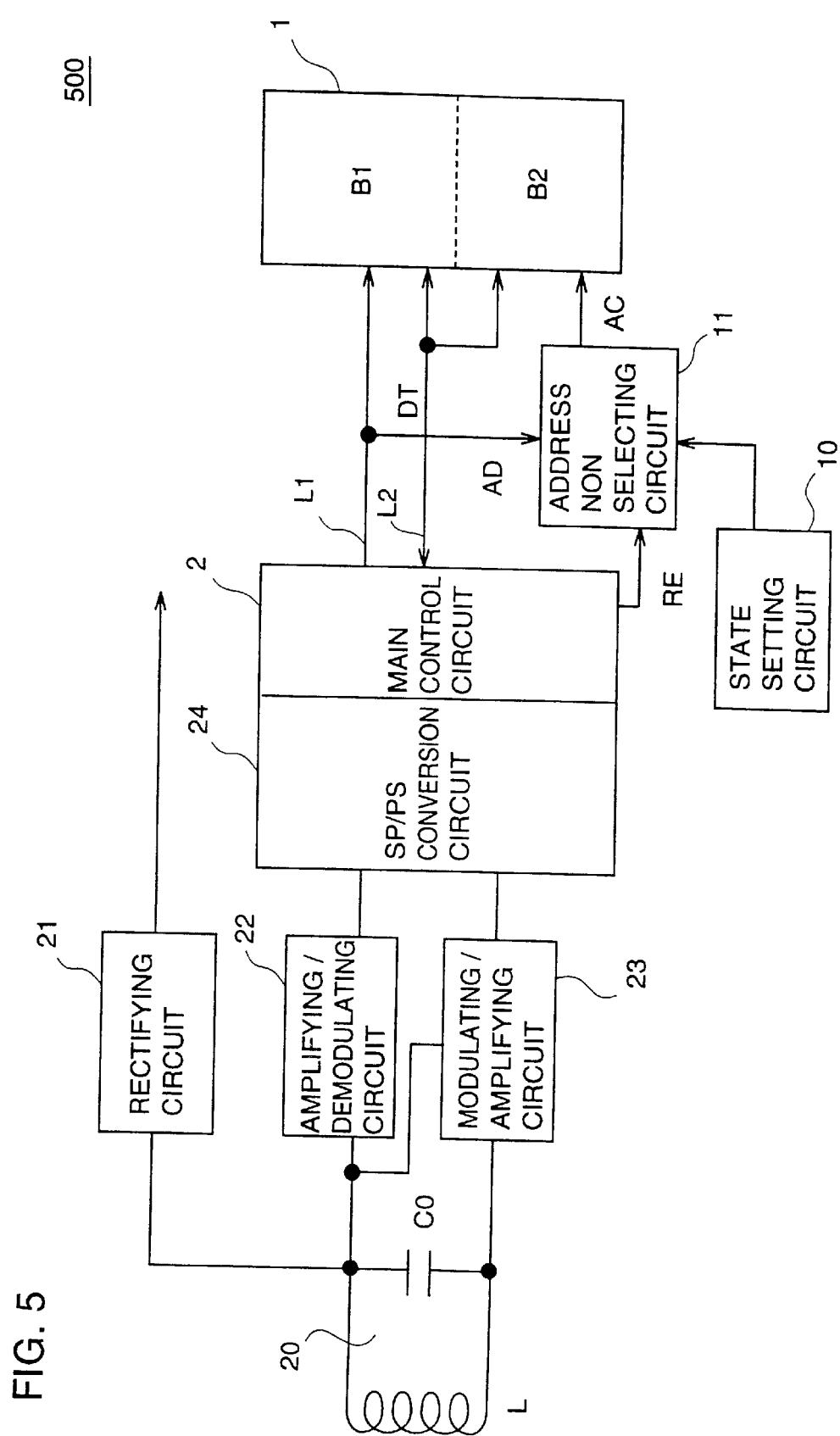
FIG. 5 shows a structure of a main portion of a non contact type IC card 500 according to a fifth embodiment of the present invention.

FIG. 5 shows a structure of a main portion of a non contact type IC card 500 according to the fifth embodiment of the present invention, wherein components similar to those in non contact type IC card 100 shown in FIG. 1 are denoted by the same reference numbers and same reference characters, and the description thereof will not be repeated.

Non contact type IC card 500 shown in FIG. 5, is different from conventional non contact type IC card 900 in that it includes a state setting circuit 10 and an address non selecting circuit 11 controlling a designated address to which data is to be written at the writing to data protection region B2 of memory 1.

With reference to FIG. 5, the structure of non contact type IC card 500 according to the fifth embodiment of the present invention will be described.

Address non selecting circuit 11 receives a write enable signal RE output from main control circuit 2 and address signal AD via address line L1 as inputs. Here, address signal AD designates a location in data protection region B2 to which data DT on data line L2 is to be written. Address non selecting circuit 11 controlled by state setting circuit 10 described below, outputs address selecting signal AC according to address signal AD.

State setting circuit 10 controls address non selecting circuit 11 described above.

Address selecting signal AC output from address non selecting circuit 11 changes its state according to a state (active state/inactive state) of state setting circuit 10. More specifically, when state setting circuit 10 is in an active state, address selecting signal AC selecting a location designated by address signal AD as a location to which data is to be written is output, and when state setting circuit 10 is in an inactive state, address selecting signal AC selecting a location other than the location designated by address signal AD (or selecting neither of the location) is output.

Based on the address selecting signal AC output from address non selecting circuit 11, data DT is written into the corresponding location in data protection region B2.

Next, an operation of non contact type IC card 500 according to the fifth embodiment of the present invention will be described.

First, when state setting circuit 10 is in an active state, address non selecting circuit 11 having received write enable signal RE and address signal AD outputs an address selecting signal AC selecting a location designated by address signal AD. In this case, data DT is written into the corresponding location in data protection region B2.

On the other hand, when state setting circuit 10 is in an inactive state, address non selecting circuit 11 having received write enable signal RE and address signal AD outputs an address selecting signal AC selecting a location other than the location designated by address signal AD (or selecting neither of the locations). In this case, data DT is not written into the intended location of data protection region B2.

As described above, an example of such state setting circuit 10 includes a fuse.

Thus even if the rewriting operation occurs, non contact type IC card 500 can inhibit the rewriting of the intended data, after the data requiring security is stored in data protection region B2 (protection data storage state), by controlling the state of state setting circuit 10.

Thus, as non contact type IC card 500 allows the control of address selection in the data protection region at the data writing operation, rewriting and use of the data previously stored in the data protection region can be prevented.

Sixth Embodiment

According to the sixth embodiment of the present invention, a non contact type IC card includes an OTP ROM (an non volatile memory allowing only one rewriting) as a storage medium corresponding to the data protection region.

Figure 6:
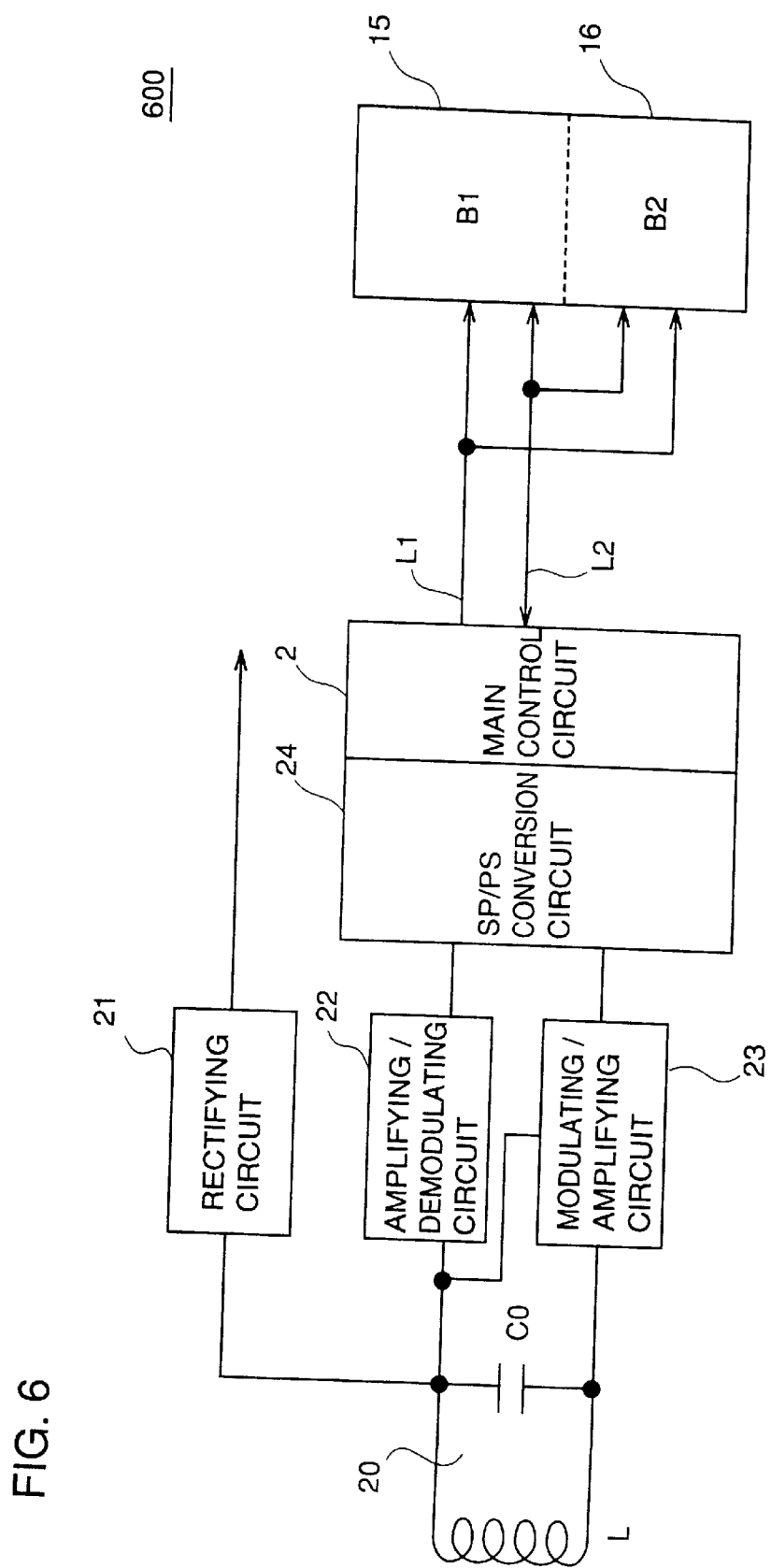
FIG. 6 shows a structure of a main portion of a non contact type IC card 600 according to a sixth embodiment of the present invention.

FIG. 6 shows a structure of a main portion of a non contact type IC card 600 according to the sixth embodiment of the present invention, wherein components similar to those in non contact type IC card 100 shown in FIG. 1 are denoted by the same reference characters and the description thereof will not be repeated.

Non contact type IC card 600 shown in FIG. 6 is different from conventional non contact type IC card 900 in that it includes a memory 15 and a memory 16 instead of memory 1.

With reference to FIG. 6, the structure of non contact type IC card 600 according to the sixth embodiment of the present invention will be described.

Memory 15 is a storage medium storing rewritable data whereas memory 16 is a storage medium storing data requiring the security.

Specifically, memory 15 includes a non volatile memory allowing rewriting as required such as an EEPROM and a flash memory, whereas memory 16 includes a memory allowing only one rewriting such as an EPROM.

Next, an operation of non contact type IC card 600 according to the sixth embodiment of the present invention will be described. For simplicity, in the description, memory 16 is assumed to be an EPROM.

Data to be held that is output from main control circuit 2 is stored in memory 15 or memory 16.

In this case, as memory 16 is an EPROM, once electric charge is stored in a memory cell not shown, the electric charge cannot be discharged until it is exposed to ultraviolet light. Therefore, assuming that the state of a memory cell with electric charge stored is called state 1 and the discharged state of the memory cell is called state 0, after the encapsulation of IC card 600, in memory 16, a memory cell in the state 0 can be charged to be the state 1, however, a memory cell in the state 1 cannot be rewritten to be the state 0.

Therefore, it is highly unlikely that the trial of rewriting of data once stored in memory 16 achieves the intended data rewriting.

Thus, with the use of an OTPROM as a medium for storing data to be protected, non contact type IC card 600 allows the suppression of data falsification to an extremely low level.

As can be seen from the foregoing, according to the present invention, the rewriting of storage region in which data requiring the security is stored can be prevented through the control of data rewriting.

In addition, according to the present invention, as the rewriting can be controlled with respect to the storage region in which data requiring the security is stored, the reliability of the non contact type IC card can be dramatically improved.

What is claimed is:

1. A non contact type IC card performing a data communication based on an externally applied radio wave signal, comprising:

receiving means (20) for receiving said radio wave signal;

first storing means (82) for storing said data requiring security;

second storing means (81) for storing data other than said data to be stored in said first storing means (B2);

control means (2) for generating said data based on the radio wave signal received at said receiving means (20) and controlling for writing said data into a location in one of said first storing means (B2) and said second storing means (B1) according to a content of said generated data;

detection means (7) for detecting a frequency of the radio wave signal received by said receiving means (20); and selection means (8) for selecting whether said data is to be written into said location in said first storing means (82) designated by said control means (2) based on a result of the detection by said detection means (7);

wherein when said receiving means (20) receives said radio wave signal and the frequency of said radio wave signal is detected to be a first frequency by said detection means (7), said data is written into said location in said first storing means (82) designated by said control means (2), whereas when the frequency of said radio wave signal is detected to be a second frequency other than said first frequency by said detection means (7), said data is not written into said location in said first storing means (B2) designated by said control means (2).

* * * * *